Oct. 28, 1947.  R. D. McCOY  2,429,636
PHASE RESPONSIVE APPARATUS
Filed May 25, 1943  2 Sheets-Sheet 1

INVENTOR
RAWLEY D. McCOY
BY
ATTORNEY

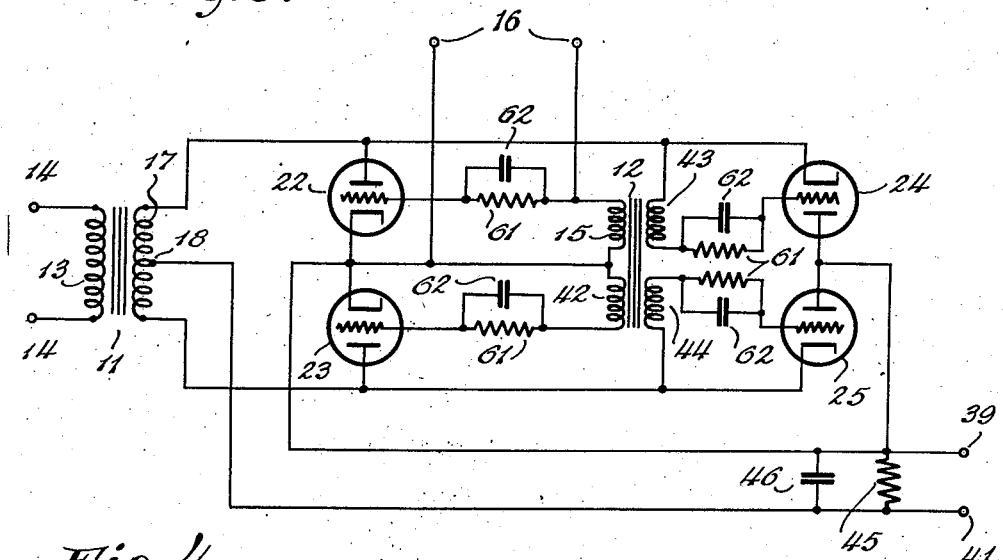

Patented Oct. 28, 1947

2,429,636

UNITED STATES PATENT OFFICE 2,429,636

PHASE RESPONSIVE APPARATUS

Rawley D. McCoy, Bronxville, N. Y., assignor to Sperry Gyroscope Company, Inc., a corporation of New York Application May 25, 1943, Serial No. 488,396

8 Claims. (Cl. 250—27)

My invention relates to phase responsive apparatus, and concerns particularly methods and apparatus for indicating the phase relationship between two input alternating voltages and for controlling other apparatus in accordance with such variations in phase as may exist.

An object of my invention is to provide arrangements for simultaneous amplification and phase detection.

Another object is to provide arrangements for the vectorial combination of two alternating electrical input quantities without interaction between them or reaction from a load.

Other and further objects and advantages will become apparent as the description proceeds.

In carrying out my invention in its preferred form, I utilize a pair of input transformers which may be energized by an alternating-current or voltage signal input and a reference input, respectively. One of the transformers, for example the transformers energized by the signal input, has a center-tapped secondary winding, and has a pair of electric discharge devices, such as triodes, connected in series across its secondary winding with one pair of like electrodes connected together to form a junction terminal. Output terminals of the circuit are connected to the center tap of the transformer secondary winding and to the junction terminal of the triode vacuum tubes. Preferably, a second pair of triodes is also connected in series across the signal transformer secondary winding, but each with opposite polarity compared with the first pair of triodes. The reference voltage transformer is provided with four windings, each of which is connected in the grid circuit of a different one of the triode vacuum tubes. One of the windings may also be used as a primary winding connected to the reference voltage source.

A better understanding of the invention will be afforded by the following detailed description considered in connection with the accompanying drawings, and those features of the invention which are believed to be novel and patentable will be pointed out in the claims appended hereto.

In the drawings,

Fig. 3 is a circuit diagram of a modification of the arrangement of Fig. 2, avoiding the use of bias batteries;

Fig. 4 is a graph illustrating the wave form of an input signal which may be applied to the apparatus and showing two opposite phase relationships;

Fig. 5 is a graph illustrating the wave form of a reference voltage which may be used in connection with the apparatus of Figs. 2 and 3; and Fig. 6 is a graph illustrating the wave shape of the output voltage obtained from the apparatus of Figs. 2 and 3, and showing the effect on the output voltage of the reversal of phase illustrated in Fig. 4.

Like reference characters are utilized throughout the drawings to designate like parts.

Figure 1:
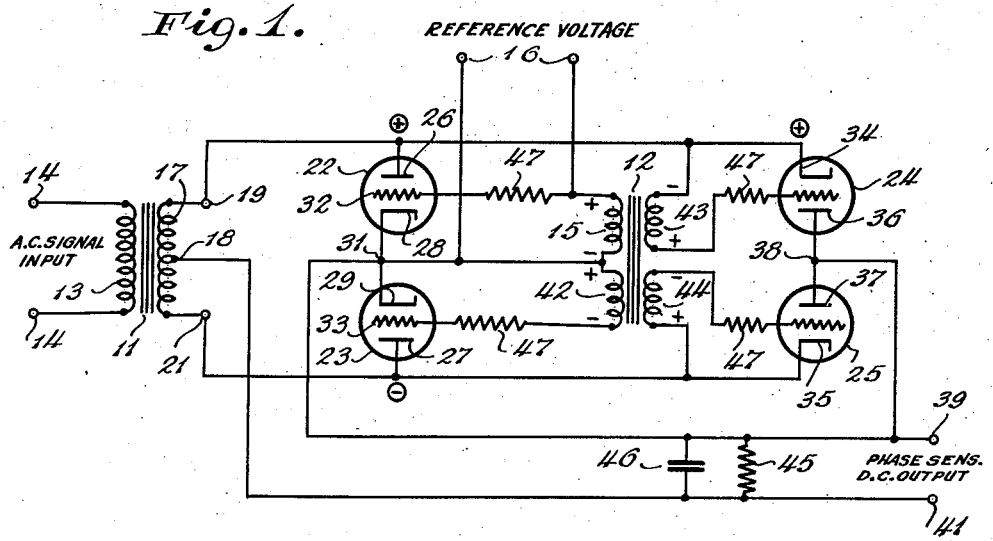
Fig. 1 is a circuit diagram of one embodiment of my invention.

In the apparatus illustrated in Fig. 1 there is a pair of input transformers 11 and 12. The transformer 11 has a primary winding 13 connected to a pair of input terminals 14, and the transformer 12 has a winding 15 connected to a pair of input terminals 16. One pair of input terminals, for example the pair of terminals 16, is adapted to be connected to a source of reference voltage, and the other pair of input terminals, in this case the pair of terminals 14, is adapted to be connected to a source of signal voltage which is to be compared in phase with the reference voltage. It will be understood that the reference voltage will have the anticipated frequency of the signal voltage.

The transformer 11 has two secondary windings in series or a single secondary winding 17 with an intermediate tap, preferably a center tap 18, and end terminals 19 and 21. A pair of current-controlling devices 22 and 23, of the type having voltage responsive control elements, is connected in series across the secondary winding 17. A second pair of current-controlling devices 24 and 25 is also connected in series between the transformer end terminals 19 and 21.

The current-controlling devices 22 to 25, inclusive, may take the form of electric discharge devices, such as triode vacuum tubes for example. The devices 22 and 23 may constitute units of a twin triode vacuum tube having a common envelope, and likewise the devices 24 and 25 may constitute units of a second twin triode.

The units 22 and 23 comprise positive electrodes or anodes 26 and 27 connected to transformer end terminals 19 and 21, negative electrodes or cathodes 28 and 29 connected together and to a junction terminal 31, and control electrodes or grids 32 and 33. It will be observed that the current-controlling devices 22 and 23 are connected in opposing relation; that is, with one pair of like electrodes or electrodes of the same polarity connected together. The devices 24 and 25 are also connected in opposed relation with one pair of like electrodes connected together, but they are each connected to the transformer winding 17 in relation opposite to the relation of the units 22 and 23.

Thus, the devices 24 and 25 have cathodes 34 and 35 connected to the transformer end terminals 19 and 21 and anodes 36 and 37 connected together and to a junction terminal 38. The two junction terminals 31 and 38 are connected to an output terminal 39 and the transformer center tap 18 is connected to a second output terminal 41.

The transformer 12 comprises, in addition to the winding 15, three other windings 42, 43 and 44. For the sake of compactness, the transformer 12 is arranged as a semi-autotransformer with the winding 15 serving both as a primary winding and as one of the secondary windings. It will be understood, however, that if a separate primary winding is employed it will be connected to the reference voltage input terminals 16, and that an additional secondary winding will be provided for connection to the grid 32 and the cathode 28 of the triode 22. The winding 42 is connected to the cathode 29 and the grid 33 of the triode 23. The windings 43 and 44 are connected in the grid circuits of the triodes 24 and 25, respectively.

The transformer 12 is so wound that the upper ends of the windings 15 and 42 and the lower ends of the windings 43 and 44 have the same relative polarity at any given instant. For example, at the instant when the grid end of the winding 15 has positive polarity, the grid end of the winding 42 has negative polarity, as indicated by the plus and minus signs. With respect to the grids 32 and 33, the windings 15 and 42 may be spoken of as having opposite relative polarities. Likewise, at the same instant the grid end of the winding 43 has positive polarity and the grid end of the winding 44 has negative polarity. For the sake of illustration it may be assumed that at the same instant at which the grids have the polarities just designated, the instantaneous polarity of the signal voltage is such that the anode 26 and the cathode 34 have positive polarity voltage applied thereto, and the anode 27 and cathode 35 have negative polarity voltage applied thereto.

Owing to the manner in which the windings and triodes are connected, at any given instant maximum current will flow in one but not in all of the triodes 22, 23, 24 and 25. For example, with the instantaneous polarities assumed and indicated by the plus and minus signs, the anode 26 and the grid 32 of the tube 22 will both have positive potential applied thereto and saturation current will flow in the triode 22. However, no current can flow in the triode 23 because negative potential is applied to its anode. Likewise, no current can flow in the triode 24 because positive potential is applied to its cathode.

The triode 25 has negative potential applied to its cathode and would be in condition to conduct current if the grid potential were above cut-off value. However, at the instant assumed, the transformer winding 44 applies negative voltage to the grid of the triode 25 and minimum current flows therein unless the magnitude of the reference voltage is sufficient to drive the tube 25 to cut-off. Preferably, a large enough value of reference voltage is chosen so that the tubes will be driven beyond cut-off during negative half cycles of grid voltage. However, effective operation will be obtained in either case.

At the instant assumed, the discharge current through the tube 22 will preponderate over that through the tube 25 and current will flow through the load resistor 45 in such a direction that the terminal 39 will be positive and the terminal 41 negative. At an instant 180 electrical degrees later, all of the polarities will be reversed and preponderating current will flow through the triode 23 to the output circuit, again applying positive potential to the terminal 39 and negative potential to the terminal 41.

When the input voltage is reversed in polarity with respect to the reference voltage, preponderating currents will flow alternately through the triodes 24 and 25 instead of through the triodes 22 and 23, thus causing negative potential to be applied to the output terminal 39 and positive potential to the output terminal 41. Thus, the polarity of the potential between the output terminals 39 and 41 is indicative of the phase relationship between the input voltages at the terminals 14 and 16.

In case of phase lag or phase lead between the input voltages, current will flow for a portion of a cycle through the triodes 22 and 23 and for the remaining portion of a cycle through the tubes 24 and 25. Consequently, the potential difference between the terminals 39 and 41 will be less than for phase coincidence of input voltages; and a balanced current condition will take place with zero output potential difference when the input voltages are in phase quadrature.

For the purpose of smoothing the output voltage, a load resistor 45, by-passed by a filter condenser 46, or a filter condenser 46 alone may be connected between the output terminals 39 and 41.

For protecting the triodes grid-current limiting resistors 47 are preferably provided. These serve also to make the output of the circuit substantially independent of variation in peak amplitude of the reference voltage if the reference voltage is applied at the terminals 16. The output will then depend chiefly upon the phase and amplitude of the signal voltage applied to the terminals 14.

Figure 2:
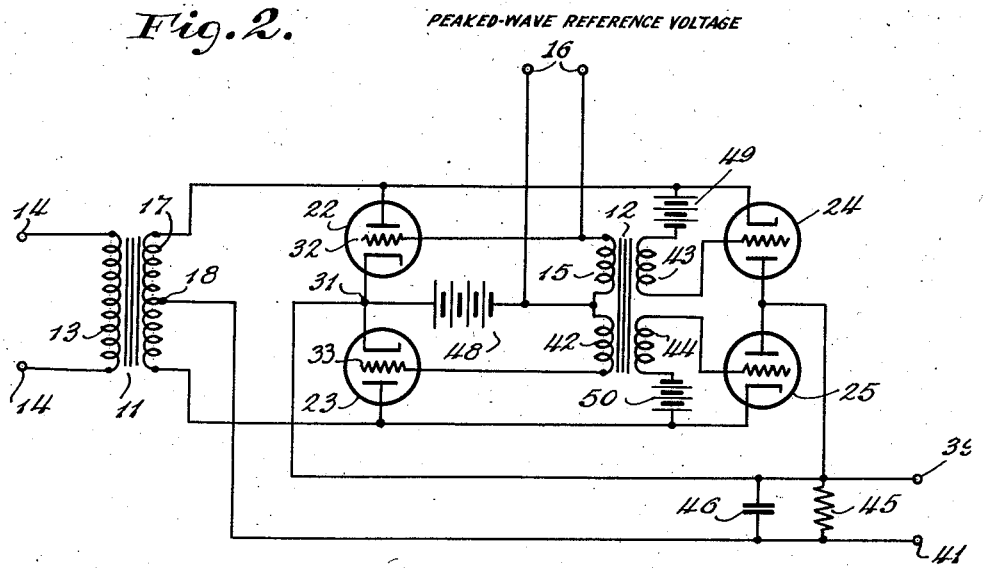
Fig. 2 is a circuit diagram of another embodiment of my invention, especially adapted for use with a peaked-wave reference voltage.

In the arrangement of Fig. 1 the reference voltage applied to the terminals 16 may be sinusoidal. Peaked wave reference voltage may also be employed; however, in case a peaked wave is employed the precision effect of the peaked wave form is best obtained by introducing a negative bias in the grid circuits of the vacuum tubes. For example, as illustrated in Fig. 2, bias batteries 48, 49 and 50 may be provided. A common bias battery 48 may be utilized for the grids 32 and 33 if desired, but obviously separate bias batteries 49 and 50 will be required for the triode units 24 and 25. A peak wave reference voltage source (not shown), with a wave form as illustrated in Fig. 5, is connected to the reference voltage terminals 16 of Fig. 2. The batteries 48, 49 and 50 are selected to have sufficient voltage to bias the grids beyond cut-off and the relationship between the peak voltage of the reference voltage source and the bias voltages may be such that the tubes become conducting only during the brief interval of the uppermost peak value of the reference voltage. Grid resistors are then unnecessary for protecting the tubes.

In the arrangement of Fig. 2, therefore, the amount of current flowing through each vacuum tube does not represent the area under the portion of the positive half cycle of the signal voltage occurring during the positive half cycle of the reference voltage.

In the arrangement of Fig. 2 the current flowing in any tube during the period of time that it is conducting depends upon the instantaneous value of the input signal at the instant that the reference voltage is applied to the grid of the tube in question. In this interval of time the condenser 46 is charged to the instantaneous potential of the input signal as illustrated in Fig. 6 by the points 52. During the half cycles following the application of peaked reference voltage, the output voltage of the condenser 46 falls along the exponential curves 53.

In Fig. 6 the input signal is represented by the dotted sinusoidal curve 54. The first portion of the output curve shown in full lines in Fig. 6 represents the output voltage with phase coincidence between the input signal and the reference voltage as represented by the portion 55 of the graph of Fig. 4. In the event of phase reversal of the input signal, which condition is represented by portion 56 of Fig. 4, a different pair of tubes becomes conducting and current flows during negative half cycles of the input signal instead of the positive half cycles, thus producing negative peaks 57 and intervening exponential voltage decay curves 58. It will be understood that, for some intermediate values of phase angle other than phase coincidence or phase opposition between the input signal and the reference voltage, the tubes will become conducting at some input voltage other than the maximum instantaneous value and the condenser 46 will be charged to a smaller value than shown in Fig. 6 with a magnitude and polarity depending upon the phase angle.

The use of a peaked wave reference voltage lessens the amount of filtering required and increases the rapidity of response of the circuit to changes in magnitude and phase of the signal voltage.

If it is desired to avoid the use of bias batteries such as the batteries 48, 49 and 50, the action of the circuit of Fig. 2 may be obtained by utilizing by-passed grid bias resistors 61 as shown in Fig. 3 in the grid circuits of each of the triodes. Each resistor 61 is shunted by a condenser 62 of sufficient capacitance to produce a time constant with the resistor which is long in comparison with the frequency of the signal voltage and the reference voltage.

I have herein shown and particularly described certain embodiments of my invention and certain methods of operation embraced therein for the purpose of explaining its principle of operation and showing its application, but it will be obvious to those skilled in the art that many modifications and variations are possible and I aim therefore to cover all such modifications and variations as fall within the scope of my invention, which is defined in the appended claims.

What is claimed is:

1. Phase responsive apparatus comprising, in combination, a pair of input transformers, a pair of unilateral current-controlling devices having voltage responsive control elements, a second pair of current-controlling devices having voltage responsive control elements, and a pair of output terminals, one of said transformers having a center-tapped secondary winding, one pair of current-controlling devices being connected in series opposing relation across said secondary winding with their junction terminal connected to one of said output terminals and the center tap of said secondary winding connected to the second output terminal, the second pair of current-controlling devices being connected in series-opposing relation across said secondary winding with their junction terminal connected to said first-mentioned junction terminal, one pair of current-controlling devices both being arranged to permit current flow toward their junction terminal, and the other pair of current-controlling devices both being arranged to permit current flow away from their junction terminal, the second transformer having four windings each of which is connected to the control element of one of said current-controlling devices, the relative phasing of said four windings being such that the voltages applied to the control elements of each pair of current-controlling devices have opposite polarities at any given instant, and that the voltages applied to the control elements of current-controlling devices connected to the same end of said center-tapped secondary winding have like polarity at any given instant.

2. Phase responsive apparatus comprising, in combination, first and second input transformers each having two secondary windings, first and second connections from two alternating sources to be compared in phase for energizing said first and second transformers, respectively, a pair of unilateral current-controlling devices having voltage responsive control elements, and a pair of output terminals, said current-controlling devices being connected in series-opposing relation to the series-connected secondary windings of one of said transformers and having their junction terminal connected to one of said output terminals, said secondary windings having their junction terminal connected to the other of said output terminals, and the secondary windings of the second transformer each being so phased and connected to one of the control elements of said current-controlling devices that potentials of opposite polarities are applied to said control elements at any given instant.

3. Phase responsive apparatus comprising, in combination, a pair of electric discharge devices each having an anode, a cathode, and a control electrode, first and second pairs of terminals to which voltages may be applied which are to be compared in phase, means for coupling said discharge devices in series opposition to one of said pairs of terminals, means for coupling the control electrodes of said devices to the second of said pairs of terminals, potentials of opposite polarities being applied to the control electrodes, and an output circuit with means connecting said discharge devices in parallel relation to said output circuit.

4. Phase responsive apparatus comprising in combination, first and second pairs of electric discharge devices each having an anode, a cathode and a control electrode, means for applying to said first pair of discharge devices, in series opposition, one of two voltages to be compared in phase, means for applying between the control electrodes of said first pair of discharge devices the second of said two voltages, an output circuit with means connecting said first pair of discharge devices in parallel relation to said output circuit, means for applying to said second pair of discharge devices, also in series opposition, the first of said two voltages, means for applying between the control electrodes of said second pair of said discharge devices the second of said two voltages, and means for connecting said second pair of discharge devices in parallel relation to said output circuit, each in opposing relation to the corresponding device of said first pair.

5. Phase responsive apparatus comprising in combination, first, second, third and fourth electric discharge devices, each having an anode, a cathode and a control electrode, first and second pairs of input terminals to which voltages may be applied which are to be compared in phase, means for coupling the first and second discharge devices to said first pair of terminals in series opposition with their anodes connected together, means for coupling the control electrodes of the first and second discharge devices in opposite relation to the second pair of terminals, means for coupling the third and fourth discharge devices to the first pair of terminals in series opposition with their cathodes connected together, means for coupling the control electrodes of the third and fourth devices in opposite relation to the second pair of terminals, and an output circuit with means for connecting said discharge devices in parallel relation to said output circuit.

6. Apparatus as in claim 5 with peaking means interposed in the couplings between the second pair of terminals and the control electrodes.

7. Apparatus responsive to the amplitude of a signal voltage and to its phase in relation to a reference voltage comprising in combination, a pair of electric discharge devices each having an anode, a cathode and a control electrode, means for biasing said control electrodes beyond cut-off, means for applying the reference voltage to the control electrodes of the discharge devices, an output circuit to which said discharge devices are connected in parallel relation, and means for applying the signal voltage with one polarity to the anode of one of said discharge devices and with the opposite polarity to the anode of the other discharge device, the magnitude of the reference voltage being sufficient to overcome the cut-off bias and make the output relatively unresponsive to variations in magnitude of the reference voltage but responsive to magnitude and phase of the signal voltage.

8. Phase-responsive apparatus comprising in combination: first and second electron discharge devices each having an anode, a cathode, and a control electrode; means for applying to said discharge devices first and second voltages to be compared in phase; an output circuit having first and second terminals; direct connections from said first terminal to the anode of said first discharge device and the cathode of said second discharge device; connections from said second terminal to the cathode of said first discharge device and the anode of said second discharge device; means for applying said first voltage to the anodes of said discharge devices with opposite polarities; and means for applying said second voltage to the control electrodes of said discharge devices with the same polarity, said means comprising an inductive coupling between said control electrodes.

RAWLEY D. McCOY.

REFERENCES CITED

The following references are of record in the file of this patent:

UNITED STATES PATENTS

| Number | Name | Date |
|---|---|---|
| 1,986,627 | Edwards et al. | Jan. 1, 1935 |
| 2,113,220 | Power | Apr. 5, 1938 |
| 2,141,937 | Schroter | Dec. 27, 1928 |
| 2,225,348 | Mikelson | Dec. 17, 1940 |
| 2,301,635 | Norton | Nov. 10, 1942 |
| 2,318,197 | Clark | May 4, 1943 |
| 2,281,995 | Purington | May 5, 1942 |
| 2,335,265 | Dodington | Nov. 30, 1943 |
| 2,242,946 | Faulk | May 20, 1941 |